US012506292B2

(12) United States Patent
Ni

(10) Patent No.: US 12,506,292 B2
(45) Date of Patent: Dec. 23, 2025

(54) PIN, PANEL STRUCTURE, AND EXTENSION SOCKET THEREOF

(71) Applicant: Top Greener, Inc., Irvine, CA (US)

(72) Inventor: Lidong Ni, Zhejiang (CN)

(73) Assignee: Top Greener, Inc., Irvine, CA (US)

( * ) Notice: Subject to any disclaimer, the term of this patent is extended or adjusted under 35 U.S.C. 154(b) by 297 days.

(21) Appl. No.: 18/356,745

(22) Filed: Jul. 21, 2023

(65) Prior Publication Data

US 2024/0136754 A1 Apr. 25, 2024
US 2024/0235092 A9 Jul. 11, 2024

(30) Foreign Application Priority Data

Oct. 19, 2022 (CN) ........................ 202222759939.9

(51) Int. Cl.

| | |
|---|---|
| ***H01R 13/447*** | (2006.01) |
| ***H01R 13/04*** | (2006.01) |
| ***H01R 13/639*** | (2006.01) |
| *H01R 13/52* | (2006.01) |

(52) U.S. Cl.

CPC ........... *H01R 13/447* (2013.01); *H01R 13/04* (2013.01); *H01R 13/6392* (2013.01); *H01R 13/52* (2013.01)

(58) Field of Classification Search

None
See application file for complete search history.

(56) References Cited

U.S. PATENT DOCUMENTS

| | | | | |
|---|---|---|---|---|
| 5,094,630 A * | 3/1992 | Jammet | H01R 31/02 | 439/652 |
| 5,320,563 A * | 6/1994 | Liao | H01R 13/68 | 439/910 |
| 6,328,581 B1 * | 12/2001 | Lee | H01R 27/00 | 439/106 |
| 7,249,976 B1 * | 7/2007 | Watson | H01R 13/71 | 439/651 |
| 8,834,210 B2 * | 9/2014 | Brausen | H01R 13/7135 | 439/718 |
| 9,525,232 B1 * | 12/2016 | Insalaco | H01R 31/06 | |
| 11,387,614 B1 * | 7/2022 | Feld | H01R 27/00 | |
| 11,462,865 B2 * | 10/2022 | Mahood | H01R 24/76 | |
| 2004/0121648 A1 * | 6/2004 | Voros | H01R 13/6215 | 439/535 |
| 2018/0316145 A1 * | 11/2018 | Mckiernan | H01R 25/006 | |

FOREIGN PATENT DOCUMENTS

| | | | | |
|---|---|---|---|---|
| BR | 102012024762 A2 * | 2/2016 | H01R 13/447 |
| CN | 108206346 A * | 6/2018 | H01R 13/04 |
| CN | 108258493 A * | 7/2018 | H01R 13/502 |
| DE | 102021126140 A1 * | 6/2022 | H01R 13/41 |
| GB | 2261329 A * | 5/1993 | H01R 13/447 |
| KR | 101717227 B1 * | 3/2017 | H01R 43/24 |
| KR | 20170056157 A * | 5/2017 | H01R 31/06 |
| WO | WO-2006126174 A1 * | 11/2006 | H01R 25/003 |

* cited by examiner

*Primary Examiner* — Tho D Ta

(74) *Attorney, Agent, or Firm* — Ziegler IP Law Group, LLC.

(57) ABSTRACT

The present application relates to the technical field of connecting devices, and discloses a pin, a panel structure, and an extension socket thereof. The pin includes wiring terminals and a mounting base. The mounting base is provided with at least two mounting holes into which the wiring terminals are embedded. The mounting base is further provided with a through hole. The present application has the effect of improving production efficiency of extension sockets.

10 Claims, 5 Drawing Sheets

PIN, PANEL STRUCTURE, AND EXTENSION SOCKET THEREOF

FIELD

The present application relates to the technical field of connection devices, and in particular, to a pin, a panel structure, and an extension socket thereof.

BACKGROUND

At present, an extension socket is a movable multi-socket with a power cord and a plug, and more than one power plug can be connected to the extension socket.

According to the publication number of relative technique, provided is a panel structure, including a base and a cover body covering the base, the base being provided with a plurality of jacks, and wiring terminals being inserted inside the jacks.

In the process of realizing the present application, the inventor has found that this technique at least has the following problems: at present, when the wiring terminals are installed on the panel structure, the wiring terminals need to be installed on the panel one by one, which has cumbersome steps and is low in assembly efficiency.

SUMMARY

In order to improve the problem of inconvenient installation of wiring terminals, the present application provides a pin, a panel structure, and an extension socket thereof.

The pin, the panel structure, and the extension socket thereof provided by the present application adopt the technical solutions as follows:

A pin includes wiring terminals, and further includes a mounting base, wherein the mounting base is provided with at least two mounting holes into which the wiring terminals are embedded, and the mounting base is further provided with a through hole.

By adopting the above technical solution, the pin is provided with a plurality of wiring terminals. When assembling a panel structure, the pin is directly installed on a base of the panel structure by means of a connecting piece, which is completed in one step, reduces the time for assembling the wiring terminals with the panel structure, and improves production efficiency.

Optionally, the wiring terminals each include a wiring portion and a conductive portion that are integrally formed, the conductive portion passes through the mounting hole and extends to the other side of the mounting base, and first positioning blocks are provided on the end face, away from the wiring portion, of the mounting base.

By adopting the above technical solution, the first positioning blocks can be matched with jacks formed in the base of the panel structure, which plays a role in quickly positioning the pin at a specified position of the base, facilitates the connection between the base and the mounting base, and improves the production efficiency.

A panel structure includes pins, a base, and a cover body covering the base, wherein the cover body and the base enclose to form an accommodating space, the pins are provided in the accommodating space, and wiring terminals pass through the base and extend to the side, away from the cover body, of the base.

By adopting the above technical solution, when an original plug structure is replaced with the panel structure, and the panel structure is installed on a socket, compared with the plug structure, the panel structure is less likely to be pulled out of the socket. The pins are directly installed on the base, so that the wiring terminals do not need to be installed one by one, which has the function of quickly installing the terminal blocks, and saves time and labor. A part of the wiring terminals are hidden in the panel structure to prevent people from touching by mistake and thus protect personal safety. By adopting the panel structure, the waterproof performance and the dustproof performance of the panel structure when being connected to the socket are improved.

Optionally, a locking structure is provided between the base and the mounting base for connecting them, the locking structure includes a fixing column provided on the base, a bolt is in threaded connection with the fixing column, and the head of the bolt abuts against the end face, away from the base, of the mounting base.

By adopting the above technical solution, when installing the pin, the fixing column is embedded into the through hole, at this time, the wiring terminals pass through the base and extend to the side, away from the cover body, of the base, and then the pin is connected to the base by means of the bolt, having the effect of quickly installing a plurality of wiring terminals on the base.

Optionally, a fixing groove is formed in the end face, facing the base, of the cover body, a fixing strip is provided on the end face, facing the cover body, of the base, the fixing strip is provided around the inner wall of the fixing groove, and the side wall of the fixing groove fits the fixing strip.

By adopting the above technical solution, the fixing strip is provided, which has a guiding function, so that the cover body can smoothly covers outside the fixing strip.

Optionally, a plurality of limiting bases for restricting movement of wires in the extension socket are provided on the end face, facing the cover body, of the base.

By adopting the above technical solution, the wires are clamped between two limiting bases, or guided and clamped between the limiting base and the fixing strip, for being limited, so that the wires on the base are arranged orderly, which is convenient for future maintenance.

Optionally, first clamping structures are provided between the fixing strip and the cover body for connecting them, the first clamping structures each include a first clamping block provided on the outer wall of the fixing strip, and first clamping holes into which the first clamping blocks are embedded are formed in the inner wall of the fixing groove.

By adopting the above technical solution, when the cover body and the base are separated, the first clamping blocks are driven to be separated from the first clamping holes, and then the cover body and the base are driven to separate. On the contrary, when the first clamping blocks are embedded into the first clamping holes, the cover body and the base are connected and fixed.

Optionally, the base is covered with a housing covering the cover body and the base.

By adopting the above technical solution, the housing covers the cover body and the base, which prevents people from touching the cover body and the base by mistake, and meanwhile, has dustproof and waterproof effects.

Optionally, an operating structure is provided between the base and the housing for connecting them, the operating structure includes second operating blocks provided on the side surface of the base and first operating blocks provided on the inner wall of the housing, and when the base is connected to the housing, the second operating blocks are located on the sides, away from the cover body, of the first operating blocks.

By adopting the above technical solution, when the second operating blocks abut against the ends, close to the bottom wall of an accommodating groove, of the first operating blocks, the housing and the base are connected and fixed, so that the housing and the base are not easy to separate.

An extension socket includes a panel structure, wherein an extension socket structure is connected to one side of the panel structure, the extension socket structure includes an extension socket body, wires are electrically connected to one side of the extension socket body, the wires pass through the cover body and extend into an accommodating space, and the ends, away from the extension socket body, of the wires are connected to wiring terminals.

By adopting the above technical solution, by means of the panel structure and the extension socket structure, the function of converting one mains plug into several ones can be achieved, and the extension socket structure can protect electric equipment.

In summary, the present application has at least one of the following beneficial technical effects.

1. The pin is provided with the plurality of wiring terminals. When assembling the panel structure, the pins are directly installed on the base of the panel structure by means of connecting pieces, which is completed in one step, reduces the time for assembling the wiring terminals with the panel structure, and improves production efficiency.
2. The first positioning blocks and second positioning blocks are provided, which is convenient for positioning the pins on the base, and convenient for the staff to connect and fix the mounting bases and the base by means of bolts.
3. The first connecting structures and the second connecting structures are provided, which improves connection stability between the cover body and the base, and it is inconvenient to separate the cover from the base.

Figure 1:
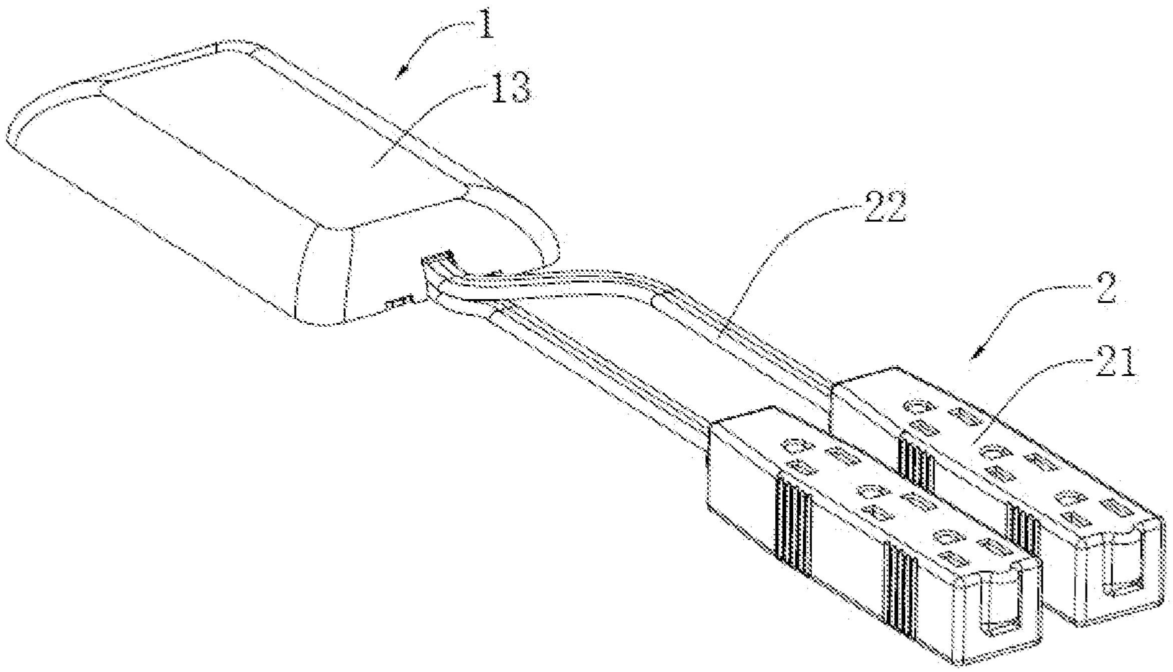
FIG. 1 is a schematic structural diagram of an embodiment of the present application.

Reference numerals: 1, panel structure; 11, base; 111, second clamping hole; 112, clamping groove; 113, limiting base; 114, clamping strip; 12, cover body; 121, fixing groove; 122, fixing hole; 123, first clamping hole; 124, pressing tube; 125, rib; 13, housing; 131, accommodating groove; 132, accommodating hole; 14, fixing strip; 141, wire inlet; 142, accommodating space; 15, jack; 16, positioning groove; 2, extension socket structure; 21, extension socket body; 22, wire; 3, first clamping structure; 31, first clamping block; 4, second clamping structure; 41, clamping rod; 42, second clamping block; 5, operating structure; 51, first operating block; 52, second operating block; 6, pin; 61, mounting base; 611, mounting hole; 612, through hole; 613, first positioning block; 614, second positioning block; 62, wiring terminal; 621, wiring portion; 622, conductive portion; 7, locking structure; 71, fixing column; 711, threaded hole; 72 bolt.

DETAILED DESCRIPTION

The present application will be further described in detail in combination with FIGS. 1-5.

The present embodiment discloses a pin, a panel structure, and an extension socket thereof. Referring to FIG. 1, an extension socket includes a panel structure 1 and extension socket structures 2. There are two extension socket structures 2, and the two extension socket structures 2 are both connected to the panel structure 1. In other embodiments, there may be one, three, four, or more extension socket structures 2.

Figure 2:
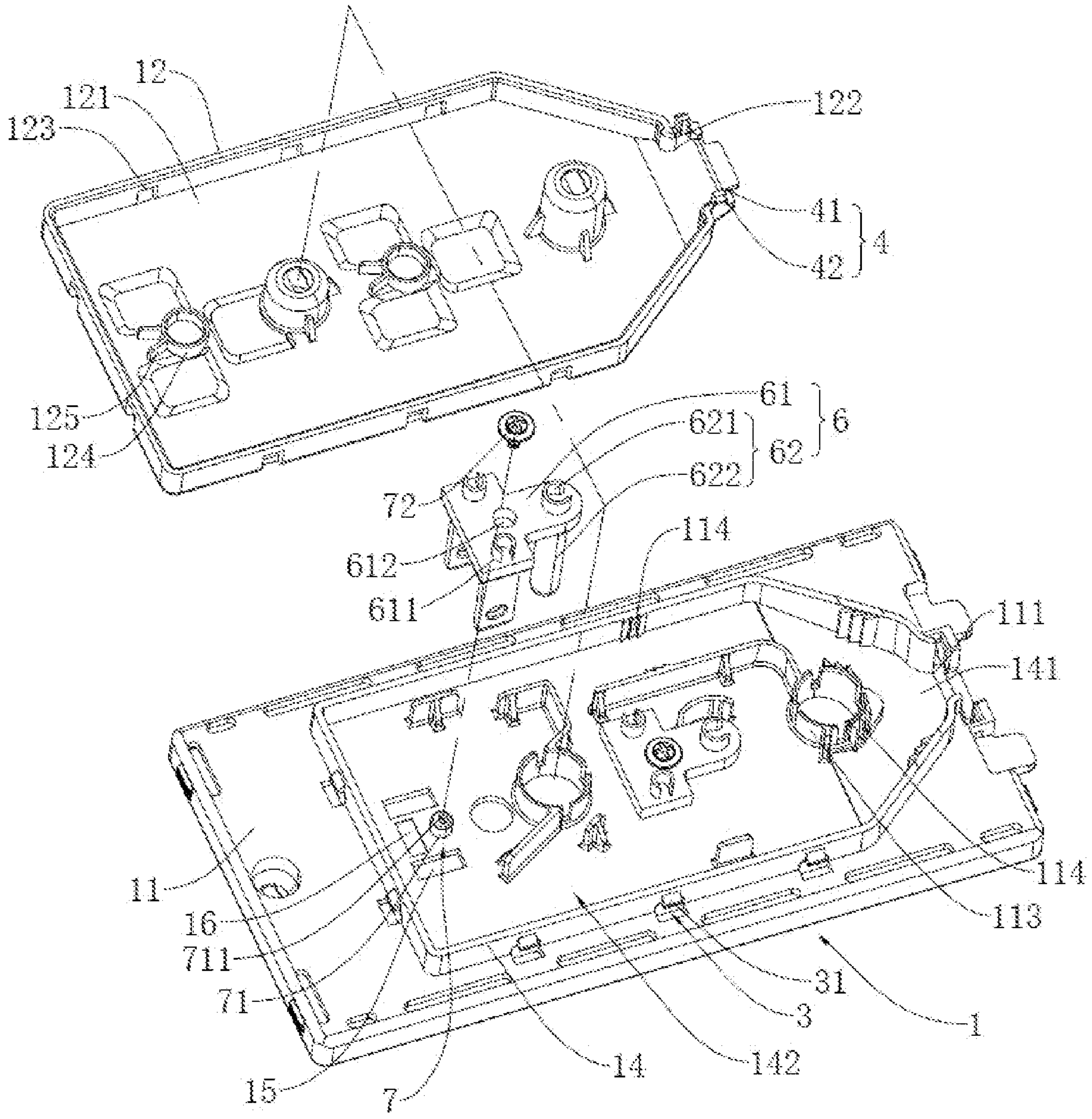
FIG. 2 is an exploded view highlighting the structure of the base and the cover.

Referring to FIG. 1 and FIG. 2, the panel structure 1 includes a base 11, a cover body 12, a housing 13, and wiring terminals 62. The cover body 12 covers the base 11. A fixing groove 121 is formed in the end face, facing the base 11, of the cover body 12. A fixing hole 122 is formed in the side surface of the cover body 12. The fixing hole 122 communicates with the fixing groove 121. A fixing strip 14 is fixedly connected to the end face, facing the cover body 12, of the base 11. The fixing strip 14 is located in the fixing groove 121. The fixing strip 14 is provided around the side wall of the fixing groove 121. A wire inlet 141 is provided on the side, close to the fixing hole 122, of the fixing strip 14. The wire inlet 141 is aligned with the fixing hole 122.

Referring to FIG. 2, the fixing strip 14, the base 11, and the cover body 12 enclose to form an accommodating space 142. The region, close to the wire inlet 141, of the accommodating space 142 is set as a first wiring region. The region, away from the wire inlet 141, of the accommodating space 142 is set as a second wiring region.

Referring to FIG. 2, a plurality of jack 15 sets are formed in the end face, away from the cover body 12, of the base 11, the number of the jack 15 sets being the same as that of the extension socket structures 2. Each jack 15 set includes three jacks 15, and in other embodiments, there may be two, four, or more jacks 15.

Referring to FIG. 2, in the present embodiment, a pin 6 is provided in each of the first wiring region and the second wiring region. Each pin 6 is connected and matched with one extension socket structure 2.

Figure 3:
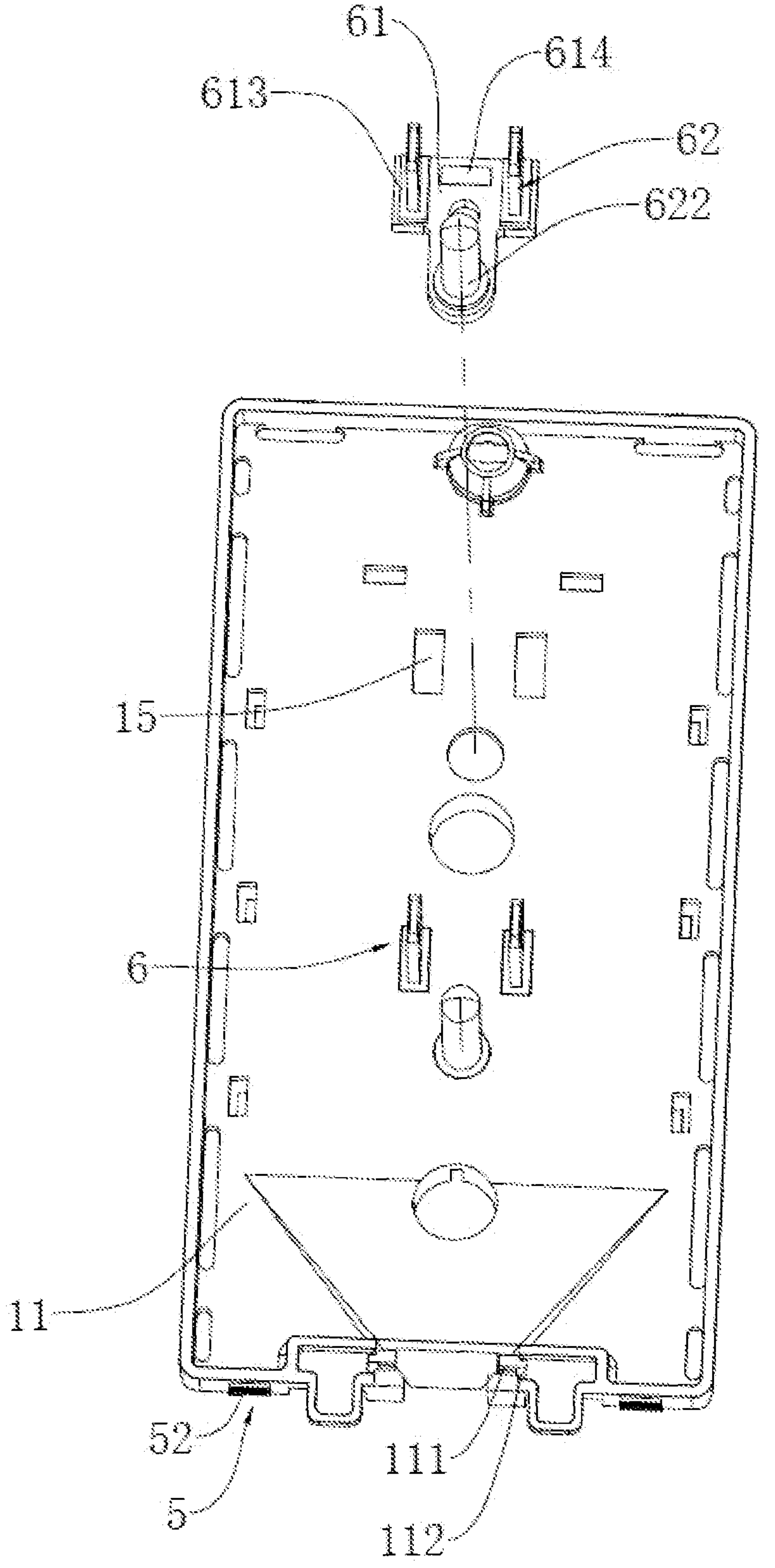
FIG. 3 is an exploded view highlighting the structure of the base and the pins.

Referring to FIG. 2 and FIG. 3, the pins 6 are provided on the base 11. The pins 6 each include a mounting base 61 and wiring terminals 62. A locking structure 7 is provided between the mounting base 61 and the base 11 for connecting them.

Referring to FIG. 2, a through hole 612 is formed in the end face, facing the base 11, of the mounting base 61. The locking structure 7 includes a fixing column 71 and a bolt 72. The fixing column 71 is fixedly connected to the end face, facing the cover body 12, of the base 11. The fixing column 71 is embedded into the through hole 612. The distance between the side, away from the base 11, of the fixing column 71 and the base 11 is less than or equal to the distance between the side, away from the base 11, of the mounting base 61 and the base 11. A threaded hole 711 is formed in the end face, away from the base 11, of the fixing column 71. The bolt 72 is in threaded connection with the threaded hole 711. The head of the bolt 72 abuts against the end face, away from the base 11, of the mounting base 61.

Referring to FIG. 2 and FIG. 3, a plurality of first positioning blocks 613 are fixedly connected to the end face, facing the base 11, of the mounting base 61, the number of the first positioning blocks 613 being the same as that of the jacks 15 in the jack 15 set. The first positioning block 613 can be embedded into the jack 15. In the present application, three first positioning blocks 613 are provided on the mounting base 61, and the three first positioning blocks 613 are in one-to-one correspondence with the three jacks 15.

Referring to FIG. 2 and FIG. 3, three mounting holes 611 are formed in the end face, away from the first positioning blocks 613, of the mounting base 61. The three mounting holes 611 are in one-to-one correspondence with the three first positioning blocks 613. The mounting hole 611 penetrates through the first positioning block 613 in the axial direction.

Referring to FIG. 2 and FIG. 3, a second positioning block 614 is fixedly connected to the end face, facing the first mounting base 61, of the mounting base 61. Positioning grooves 16 are formed in the base 11. The second positioning block 614 can be embedded into the positioning groove 16.

Referring to FIG. 2 and FIG. 3, the number of the wiring terminals 62 is the same as that of the jacks 15 in the jack 15 set. In the present application, one pin 6 includes three wiring terminals 62. The wiring terminal 62 includes a wiring portion 621 and a conductive portion 622 that are integrally formed.

Referring to FIG. 2 and FIG. 3, the wiring portion 621 is located on the end face, away from the first positioning blocks 613, of the mounting base 61. The conductive portion 622 passes through the mounting hole 611 and extends to the end, away from the wiring portion 621, of the mounting base 61. The conductive portion 622 and the mounting base 61 are integrally injection-molded.

Referring to FIG. 2 and FIG. 3, a plurality of pressing tubes 124 are fixedly connected to the bottom wall of the fixing groove 121. The number of the pressing tubes 124 is the same as that of the mounting bases 61. The plurality of pressing tubes 124 are aligned with the plurality of mounting bases 61 one by one. The bolt 72 can be embedded into the end, facing the base 11, of the pressing tube 124. Ribs 125 are fixedly connected to the outer surface of the pressing tube 124. One end of the rib 125 is fixedly connected to the bottom wall of the fixing groove 121. When the cover body 12 is installed on the base 11, the end face, away from the bottom wall of the fixing groove 121, of the pressing tube 124 abuts against the end face, away from the base 11, of the mounting base 61.

Figure 4:
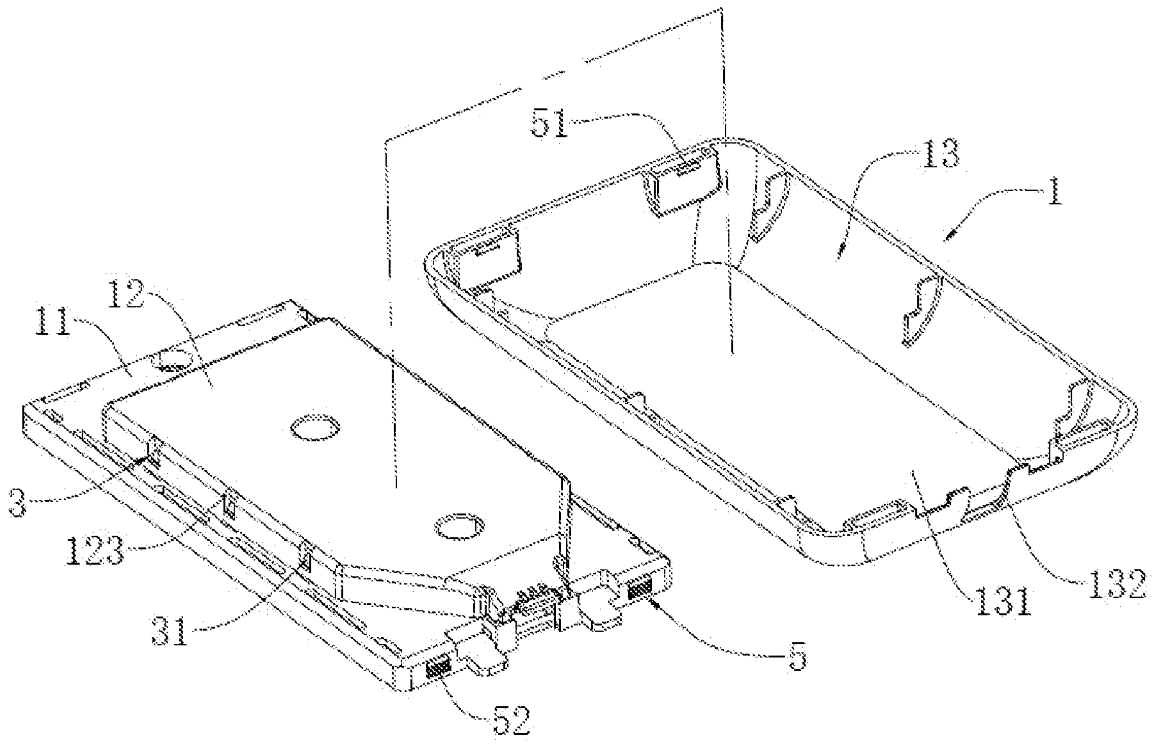
FIG. 4 is an exploded view highlighting the structure of the housing and the base.

Referring to FIG. 2 and FIG. 4, a plurality of first clamping structures 3 are provided between the fixing strip 14 and the cover body 12 for connecting them. The plurality of first clamping structures 3 are distributed along the length direction of the fixing strip 14. The first clamping structure 3 includes a first clamping block 31. The first clamping block 31 is fixedly connected to the side, away from the accommodating space 142, of the fixing strip 14. First clamping holes 123 are formed in the side wall of the fixing groove 121. The first clamping block 31 can be embedded into the first clamping hole 123.

Referring to FIG. 2 and FIG. 3, two second clamping structures 4 are provided between the base 11 and the cover body 12 for connecting them. The two second clamping structures 4 are symmetrically distributed along the axis of the fixing groove 121. Second clamping holes 111 are formed in the end face, away from the cover body 12, of the base 11. A clamping groove 112 is formed in the inner wall of each second clamping hole 111. The clamping groove 112 penetrates through the base 11 toward the side away from the cover body 12. The second clamping structure 4 includes a clamping rod 41 and a second clamping block 42. The clamping rod 41 is deformable. The clamping rod 41 is fixedly connected to the end face, facing the base 11, of the cover body 12. The clamping rod 41 is inserted into the second clamping hole 111. The second clamping block 42 is fixedly connected to the end face, facing the clamping groove 112, of the clamping rod 41. The second clamping block 42 can be embedded into the clamping groove 112. When the cover body 12 is installed on the base 11, the second clamping block 42 is embedded into the clamping groove 112, and the second block 42 fits the inner wall, close to the cover body 12, of the clamping groove 112.

Referring to FIG. 2 and FIG. 4, the housing 13 covers outside the base 11 and the cover body 12, and the side surface of the housing 13 is set as a circular arc. The housing 13 is provided with an accommodating groove 131. Both the base 11 and the cover body 12 are located in the accommodating groove 131. An accommodating hole 132 is formed in the outer surface of the housing 13. The accommodating hole 132 communicates with the accommodating groove 131. The accommodating hole 132 is aligned with the fixing hole 122.

Referring to FIG. 4, an operating structure 5 is provided between the housing 13 and the base 11 for connecting them. The operating structure 5 is provided on the side wall of the base 11 along the length direction. The operating structure 5 includes first operating blocks 51 and a plurality of second operating blocks 52. The first operating blocks 51 are fixedly connected to the side wall of the housing 13. The plurality of second operating blocks 52 are all fixedly connected to the outer surface of the base 11. The plurality of second operating blocks 52 are distributed along the axial direction of the accommodating groove 131. When the housing 13 is connected to the base 11, at least one second operating block 52 is located on the side, close to the bottom wall of the accommodating groove 131, of the first operating block 51.

Referring to FIG. 4, in other embodiments, the operating structure 5 is simultaneously provided on the side wall of the base 11 along the length direction and on the side wall of the base 11 along the width direction, or the operating structure 5 is provided on the side wall of the base 11 along the width direction.

Figure 5:
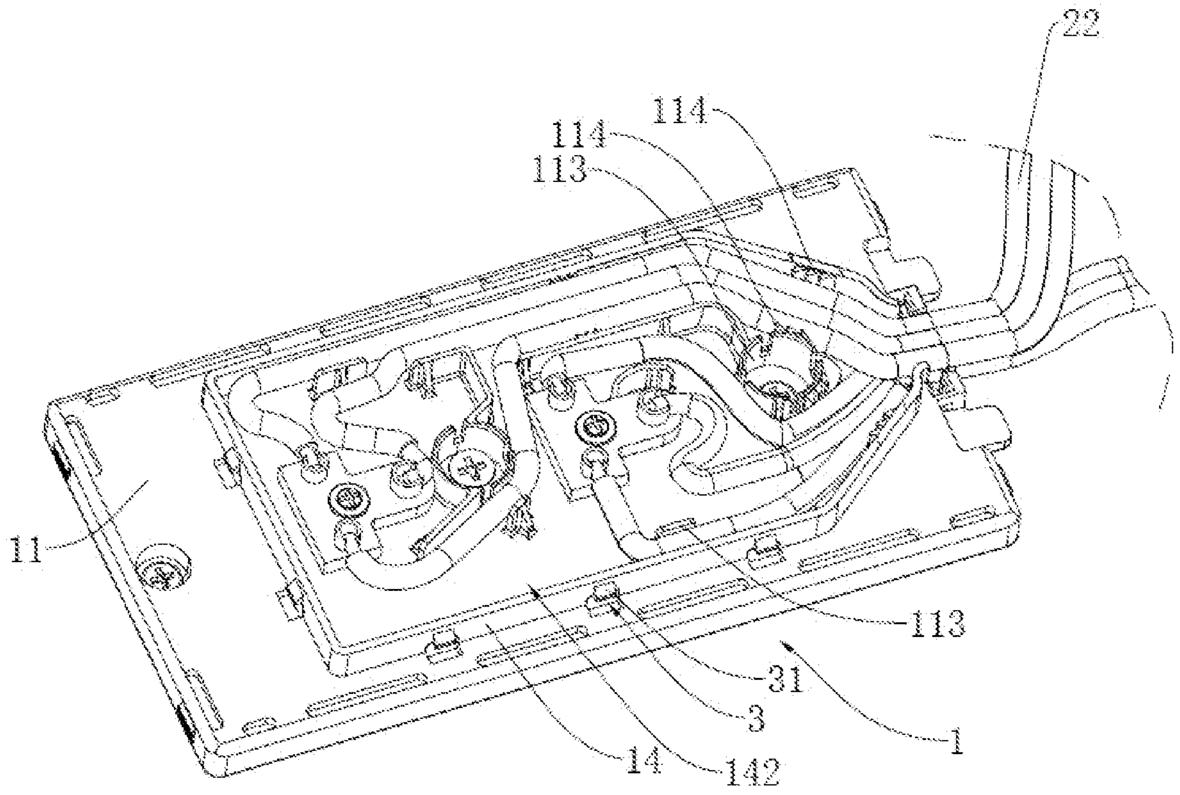
FIG. 5 is a schematic diagram of a partial structure of wires laid on the base.

Referring to FIG. 1 and FIG. 5, the extension socket structure 2 includes an extension socket body 21 and wires 22. In the present application, there are three wires 22. One end of the wire 22 along the length direction is electrically connected to the extension socket body 21, and the other end of the wire 22 along the length direction is electrically connected to the wiring portion 621.

Referring to FIG. 2, FIG. 4, and FIG. 5, the wires 22 extend into the accommodating space 142 after passing through the accommodating hole 132, the fixing hole 122, and the wire inlet 141 in sequence. In other embodiments, there may be two or four wires 22.

Referring to FIG. 2, a plurality of limiting bases 113 are provided on the end face, facing the cover body 12, of the base 11. The limiting base 113 has two limiting modes for the wires 22. The first limiting mode: the wires 22 are placed between the limiting base 113 and the fixing strip 14, and thus the wires 22 can be limited by means of cooperation between the limiting base 113 and the inner wall of the fixing strip 14. The second limiting mode: the wires 22 are placed between two limiting bases 113, and thus the wires 22 can be limited by means of the two limiting bases 113.

Referring to FIG. 2, clamping strips 114 are fixedly connected to the surface, facing the limited wires 22, of the limiting base 113. Clamping strips 114 are further fixedly connected to the surface, facing the limited wires 22, of the fixing strip 14.

The implementation principle of the pin, the panel structure, and the extension socket thereof in the embodiment of the present application is as follows: the wiring terminals 62 on the mounting bases 61 are inserted into the jacks 15. The mounting bases 61 and the base 11 are connected and fixed by means of the bolts 72, and the wires 22 are well placed on the base 11. Then, the base 11 is covered with the cover body 12, so that the first clamping blocks 31 are embedded into the first clamping holes 123, and the second clamping blocks 42 are inserted into the second clamping hole 111 and embedded into the clamping grooves 112. Finally, the base 11 and the cover body 12 are covered with the housing 13. The extension socket can be electrified by means of inserting the wiring terminals 62 into the jacks of the socket.

The above descriptions are only preferred embodiments of the present application and are not intended to limit the present application. Any modifications, equivalent replacements, improvements, etc. made within the design concept of the present application should be included in the protection scope of the present application.

What is claimed is:

1. A pin for a panel structure, wherein the pin comprises a wiring terminal, further comprising a mounting base for the pin, the mounting base being provided with at least two mounting holes into which one or more wiring terminals are embedded, and the mounting base is further provided with a through hole, and wherein the panel structure comprises:

a base, and a cover body covering the base, wherein the cover body and the base form an accommodating space, the pin being provided in the accommodating space, and the one or more wiring terminals pass through the base and extend to a side, away from the cover body of the base.

2. The pin according to claim 1, wherein the wiring terminals each comprise a wiring portion and a conductive portion that are integrally formed, the conductive portion passing through the mounting hole and extending to an other side of the mounting base, and first positioning blocks that are provided on an end face, away from the wiring portion of the mounting base.

3. A panel structure, comprising pins with wiring terminals, further comprising a mounting base, the mounting base is provided with at least two mounting holes into which the wiring terminals are embedded, and the mounting base is further provided with a through hole, a base, and a cover body covering the base, wherein the cover body and the base enclose to form an accommodating space, the pins being provided in the accommodating space, and the wiring terminals pass through the base and extend to a side, away from the cover body of the base.

4. The panel structure according to claim 3, wherein a locking structure is provided between the base and the mounting base for connecting them, the locking structure comprises a fixing column provided on the base, a bolt is in threaded connection with the fixing column, and a head of the bolt abuts against an end face, away from the base, of the mounting base.

5. The panel structure according to claim 4, wherein a fixing groove is formed in the end face, facing the base, of the cover body, a fixing strip is provided on the end face, facing the cover body, of the base, the fixing strip is provided around an inner wall of the fixing groove, and a side wall of the fixing groove fits the fixing strip.

6. The panel structure according to claim 5, wherein a plurality of limiting bases for restricting movement of wires in an extension socket are provided on the end face, facing the cover body, of the base.

7. The panel structure according to claim 5, wherein first clamping structures are provided between the fixing strip and the cover body for connecting them, the first clamping structures each comprise a first clamping block provided on the outer wall of the fixing strip, and first clamping holes into which the first clamping blocks are embedded are formed in the inner wall of the fixing groove.

8. The panel structure according to claim 3, wherein the base is covered with a housing covering the cover body and the base.

9. The panel structure according to claim 8, wherein an operating structure is provided between the base and the housing for connecting them, the operating structure comprises second operating blocks provided on the side surface of the base and first operating blocks provided on the inner wall of the housing, and when the base is connected to the housing, the second operating block is located on the side, away from the cover body, of the first operating block.

10. An extension socket, comprising the panel structure according to claim 3, wherein extension socket structures are connected to one side of the panel structure, the extension socket structures each comprise an extension socket body, a wire is electrically connected to one end of the extension socket body, the wire passes through the cover body and extends into the accommodating space, and an end, away from the extension socket body; of the wire is connected to the wiring terminal.

* * * * *